(12) United States Patent
Lorenz (10) Patent No.: US 11,468,427 B2
(45) Date of Patent: Oct. 11, 2022

(54) SYSTEMS AND METHODS FOR USE IN CONTACTLESS COMMUNICATION

(71) Applicant: MASTERCARD INTERNATIONAL INCORPORATED, Purchase, NY (US)

(72) Inventor: James David Lorenz, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 229 days.

(21) Appl. No.: 16/116,362

(22) Filed: Aug. 29, 2018

(65) Prior Publication Data

US 2020/0074441 A1 Mar. 5, 2020

(51) Int. Cl.
| G06Q 20/00 | (2012.01) |
| G06Q 20/32 | (2012.01) |
| G06K 7/14 | (2006.01) |
| G06Q 20/40 | (2012.01) |

(52) U.S. Cl.
CPC ....... *G06Q 20/3276* (2013.01); *G06K 7/1413* (2013.01); *G06K 7/1417* (2013.01); *G06Q 20/327* (2013.01); *G06Q 20/401* (2013.01)

(58) Field of Classification Search
CPC .......................... G06Q 20/3276; G06K 7/1413
USPC ..................................................... 705/17, 21
See application file for complete search history.

(56) References Cited

U.S. PATENT DOCUMENTS

| 7,832,646 | B1* | 11/2010 | Leason | ................ G06Q 20/352 |
| | | | | 235/492 |
| 2011/0251892 | A1* | 10/2011 | Laracey | .............. G06Q 20/401 |
| | | | | 705/16 |
| 2012/0209749 | A1 | 8/2012 | Hammad et al. | |
| 2012/0226565 | A1 | 9/2012 | Drozd | |
| 2013/0054468 | A1* | 2/2013 | Fuentes | ................. G06Q 40/02 |
| | | | | 705/64 |
| 2013/0246258 | A1 | 9/2013 | Dessert | |

(Continued)

FOREIGN PATENT DOCUMENTS

KR  10-2016-0134770  11/2016

*Primary Examiner* — Rokib Masud
(74) *Attorney, Agent, or Firm* — Harness, Dickey & Pierce, P.L.C.

(57) ABSTRACT

Disclosed are exemplary embodiments of systems and methods for providing contactless payment at a point-of-sale (POS) terminal associated with a merchant, without local, direct communication of the POS terminal with a payment device. One exemplary method includes receiving a selection of a modified contactless payment option for a transaction at the POS terminal. In response, the POS terminal presents a detail for the transaction and receives a transaction setup message from a payment network. The transaction setup message includes a credential for a payment account associated with the consumer. An authorization request for the transaction is then generated, which includes the payment account credential, a merchant ID of the merchant, and an amount of the transaction. The POS terminal then transmits the authorization request to the payment network, via an acquirer associated with the merchant, thereby initiating the transaction without interacting locally and/or directly with the payment device.

8 Claims, 3 Drawing Sheets

(56) References Cited

U.S. PATENT DOCUMENTS

2014/0052553 A1    2/2014  Uzo
2014/0263625 A1*  9/2014  Smets .................. G07F 7/0893
                                                        235/380

* cited by examiner

SYSTEMS AND METHODS FOR USE IN CONTACTLESS COMMUNICATION

FIELD

The present disclosure generally relates to systems and methods for use in contactless communication, and in particular, to employing network interactions with remote devices to support contactless communication between local devices.

BACKGROUND

This section provides background information related to the present disclosure which is not necessarily prior art.

Products (e.g., goods, services, etc.) are known to be offered for sale, and to be sold, by merchants. Consumers often fund purchases of such products through payment accounts, by presenting payment cards (e.g., credit cards, etc.), or more generally, payment devices, to the merchants. The payment cards, for example, are swiped or inserted into point-of-sale (POS) terminals, and payment account credentials associated with the payment cards are read or received by the merchants, which permit the merchants to initiate the transactions. Apart from physical interactions between the payment devices and the POS terminals (e.g., swipe interactions, insertion interactions, etc.), contactless scenarios exist where the payment devices, for example, smartphones with e-wallets, provide the payment account credentials to the POS terminals without physically connecting to and/or contacting the POS terminals.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

In connection with facilitating transactions with consumers, merchants often provide point-of-sale (POS) terminals to interact with payment devices, such as, for example, physical payment cards or virtual wallets, etc., provided by the consumers. The interactions may be based on contact, such as when the payment devices are swiped or inserted into the POS terminals, or they may be contactless, whereby the payment devices are waved at, tapped onto, or brought close to the POS terminals. Contactless interactions are generally limited to interactions with POS terminals, which are capable of local wireless interactions with the payment devices. Conversely, POS terminals that do not have local wireless capability, then, are limited to payment devices, which are capable of contact-based payments at the POS terminals. This, in general, limits the transactions that may be completed with those merchants.

Uniquely, the systems and methods herein enable a POS terminal, which lacks local wireless payment device capabilities, to receive payment account credential(s) without physically connecting to a local payment device (physically and/or wirelessly) and/or consistent with contactless payment. In particular, in connection with a transaction, the POS terminal receives the payment account credentials from a payment network, rather than the payment device locally. This is accomplished by a communication device of the consumer or the POS terminal submitting a transaction setup request to the payment network, based on information from the other of the communication device and the POS terminal (or another server or device). The payment network, in turn, when authorized, provides a transaction setup message to the POS terminal, which contains all the necessary information (about the consumer and/or the consumer's payment account) for the POS terminal to proceed in the transaction, in a conventional manner, and/or to generate and submit an authorization request therefor. The involvement of the payment network enables the contactless payment account transaction to be mimicked at the POS terminal (without local wireless communication with a payment device), even though the POS terminal does not have the capabilities to carry out the contactless transaction. This extends the use of the payment network, through its connectivity with the POS terminal, to facilitate contactless payment transactions between payment devices and the POS terminal, even where local wireless communication between the payment devices and the POS terminal are not possible. As can be appreciated, this improves technology at the payment network, at the payment device, and at the POS terminal, as each of these three components can now participate in a contactless payment transaction, where previously that was not possible (without the local wireless communication).

Figure 1:
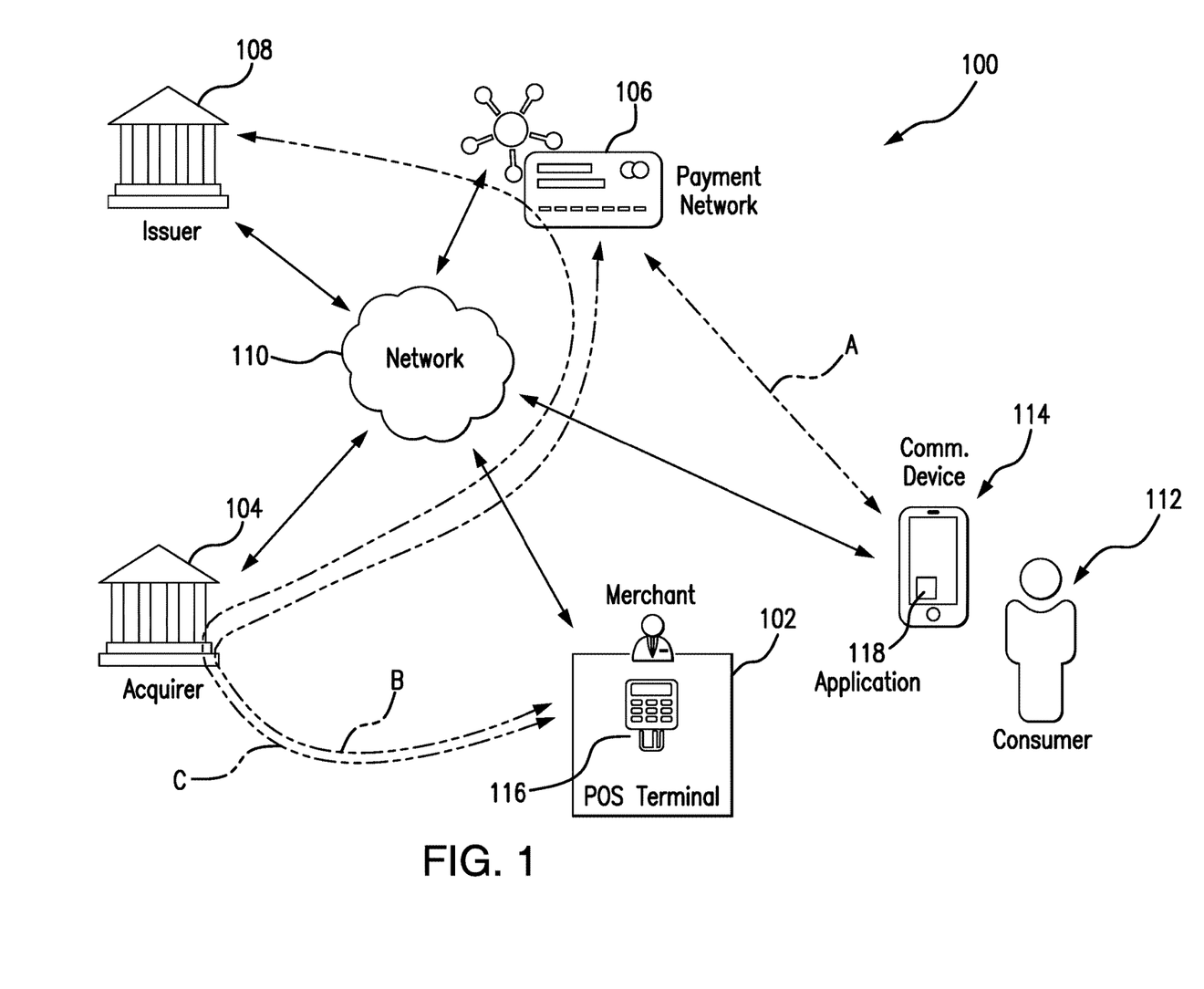
FIG. 1 illustrates an exemplary system of the present disclosure suitable for use in providing contactless payments at POS terminals, without local communication between the POS terminals and payment devices associated with initiating the payments.

FIG. 1 illustrates an exemplary system 100, in which one or more aspects of the present disclosure may be implemented. Although, in the described embodiment, the system 100 is presented in one arrangement, other embodiments may include the system 100 arranged otherwise, depending, for example, on processing of transactions, types of POS terminals involved in the transactions, types of payment devices used in the transactions, etc.

As shown in FIG. 1, the system 100 generally includes a merchant 102, an acquirer 104 associated with the merchant 102, a payment network 106, and an issuer 108, each coupled to (and in communication with) network 110. The network 110 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 110 includes multiple networks, where different ones of the multiple networks are accessible to different ones of the illustrated parts in FIG. 1. In this example, the network 110 may include a private transaction network made accessible by the payment network 106 to the acquirer 104 and the issuer 108 and, separately, a public network (such as the Internet) through which the merchant 102 communicates with other devices, such as shown in FIG. 1, for example, a communication device 114 associated with the consumer 112, etc.

In the system 100, the merchant 102 offers products (e.g., goods, services, etc.) for sale to consumers, such as the consumer 112. The products are offered for sale at a physical location of the merchant 102, at which the merchant 102 includes one or more POS terminals, such as POS terminal 116 shown in FIG. 1. In connection therewith, the POS terminal 116 is configured, by executable instructions, to initiate payment account transactions at the merchant 102 to fund the purchase of products by consumers (e.g., by the consumer 112, etc.). While one POS terminal 116 is shown in FIG. 1, it should be appreciated that the merchant 102 may have additional POS terminals, at a common location or at multiple different geographic locations of the merchant 102, for coordinating transactions with consumers via payment accounts, etc. In general, each POS terminal included at the merchant 102 (including the POS terminal 116) will include a terminal identifier or ID (or other unique identifier), which is specific to the POS terminal. As such, the POS terminal 116, for example, will include a terminal ID that is unique to the POS terminal 116, and each other POS terminal included in the merchant 102 will similarly include a terminal ID which is unique to each other POS terminal. In addition to the terminal ID, the POS terminal 116 (and other POS terminals included in the merchant 102) is further configured to include (in memory) a merchant ID for the merchant 102, and potentially other data to identify the POS terminal 116 and/or the merchant 102, for inclusion in authorization messages, and for use in transmitting the authorization messages (e.g., an acquirer ID, etc.).

Notably, it should be understood that the POS terminal 116 in FIG. 1 is configured to interact with payment devices through contact, and does not include a local wireless capability to enable the POS terminal 116 to interact with the payment devices in a conventional contactless manner. Consequently, conventional contactless payments directly between a payment device and the POS terminal 116 are not possible in the illustrated embodiment. It should be understood, however, that despite the above, the POS terminal 116 may be configured for other wireless communication with other devices (e.g., a server disposed at the merchant 102, the acquirer 104, etc.).

With continued reference to FIG. 1, the consumer 112 is associated with a payment account, which is issued by the issuer 108. The payment account includes a credit account in this exemplary embodiment, but may include a debit account, a prepaid account, or other account (or multiple accounts) in other system embodiments. In this embodiment, as shown, the communication device 114 includes a payment application 118, which may include, without limitation, an electronic wallet (or e-wallet) application (e.g., a virtual wallet application, etc.) (e.g., MasterPass®, Apple Pay®, Android Pay™, Samsung Pay®, PayPal®, Google Wallet®, etc.), etc. The communication device 114 is configured, then, by the payment application 118, to be provisioned with the payment account issued by the issuer 108 and to act as a payment device for the consumer 112 (e.g., as provisioned with a token, etc.) in connection with payment account transactions (e.g., the payment application 118 configures the communication device 114 to wirelessly provide a provisioned token or other credential to other POS terminals capable of receiving contactless payments (i.e., not the POS terminal 116), etc.).

In this exemplary embodiment, the POS terminal 116 is configured to participate in "modified contactless" payment transactions with the communication device 114, for example, through the payment network 106, and not local conventional wireless communications with the communication device 114 (or other payment device). That is, as part of a transaction at the merchant 102 by the consumer 112, the communication device 114 and/or the POS terminal 116 is/are configured to communicate with the payment network 106, which, in turn, is configured to provide a transaction setup message to the POS terminal 116 for the transaction. In response to the transaction setup message, then, the POS terminal 116 is configured to proceed with a payment account transaction (in a conventional manner).

Specifically, in one exemplary transaction in the system 100, when the consumer 112 desires to make a purchase at the merchant 102, the consumer 112 informs the merchant 102 of the desire to purchase one or more products. The merchant 102 then scans or otherwise inputs the one or more products to be purchase to the POS terminal 116, whereby a total for the purchase is determined (e.g., an amount of the transaction including costs, taxes, etc.). Thereafter, the POS terminal 116 is configured to request a form of payment. In response to the request for the form of payment, a selection of a "modified contactless" payment option may be received by the POS terminal 116 from either a user associated with the merchant 102 (e.g., an employee, cashier, etc.) or the consumer 112.

In response, according to one implementation, the POS terminal 116 is configured to present an interface, to the consumer 112, which includes one or more details of the transaction and/or the merchant 102 (broadly, the transaction detail(s)). The details may be presented as text, or as a computer-readable symbol (e.g., a barcode or QR code, etc.), at the POS terminal 116. In this manner, the POS terminal 116 may be configured to generate a transaction identifier (ID), which is specific to the transaction, and include the transaction ID as one of the transaction details presented to the consumer 112. When the transaction detail(s) are presented to the consumer 112, the consumer 112 accesses the payment application 118 at the communication device 114 and, when required or desired, authenticates himself/herself to the application 118 (e.g., via a biometric, a passcode, a motion password, etc.), via the communication device 114. Thereafter, the communication device 114, as configured by the application 118, presents the option for a modified contactless payment to the consumer 112, whereupon the consumer 112 selects the option at the payment application 118. In turn, the communication device 114, as configured by the payment application 118, solicits the transaction detail(s) from the consumer 112 (as presented at the POS terminal 116). The consumer 112 responds by entering the detail(s) (e.g., keying in the amount of the transaction, the merchant ID, the transaction ID, the terminal ID, etc.), or otherwise capturing the transaction detail(s) from the POS terminal 116. For example, where the transaction detail(s) are represented by a QR code, the communication device 114, as configured by the application 118, captures an image of the QR code (in response to a user input at an input device of the communication device 114 (e.g., a camera input device, etc.)) and decodes the QR code into the transaction details.

The communication device 114, as configured by the payment application 118, then transmits a transaction setup request, including the transaction details, to the payment network 106, along path A. The transaction details may include, for example, the transaction ID, the amount of the transaction, the terminal ID, the merchant ID, and/or an acquirer ID, etc. The transaction setup request may further include, in general, one or more details associated with the consumer 112, including, for example, a payment account credential (e.g., a payment account number, payment account token, etc.), expiration date associated with the consumer's payment account and/or payment device, a name of the consumer 112, an address, a virtual wallet identifier (e.g., a mobile phone number for the communication device 114, an email address, an application ID (associated with payment application 118), etc.), etc.

Upon receipt of the transaction setup request, the payment network 106 is configured to compile a transaction setup message and to route the transaction setup message to the POS terminal 116 at the merchant 102, via the acquirer 104 (i.e., a banking or financial institution that processes transactions on behalf of the merchant 102), as indicated by path B, or, alternatively, directly via the network 110. In the example system 100 of FIG. 1, the transaction setup message includes a payment account credential for the consumer 112 (e.g., a payment account token, a primary account number (PAN), etc.) as associated with the consumer's payment account, the amount of the transaction, the merchant ID, the terminal ID, the transaction ID, and the acquirer ID, and is routed to the POS terminal 116 based on the merchant ID and/or the terminal ID included in the transaction details from the communication device 114. It should be understood that the payment network 106 may be configured to compile the transaction setup message based on data included in the transaction setup request from the communication device 114 and/or based on further data, for example, received from and/or associated with a user profile for the consumer 112 (associated with the payment application 118, for example), which is retrieved, by the payment network 106 (from memory included in the payment network 106, the issuer 108, etc.), in response to the transaction setup request.

According to another implementation, upon receipt of a "modified contactless" payment indication from the user associated with the merchant 102 (e.g., the employee, cashier, etc.) and/or the consumer 112, the POS terminal 116 is configured to solicit a user identifier (e.g., a mobile phone number, email address, etc.) from the consumer 112. When the consumer 112 provides the user identifier, the POS terminal 116 is configured to receive the user identifier and to transmit a transaction setup request to the payment network 106 (e.g., along path B via the acquirer 104, as shown in FIG. 1; directly via the network 110; etc.), which includes one or more of the transaction details above. In response, the payment network 106 is configured to verify that the user identifier is associated with a consumer, in general (and more particularly, with the consumer 112) (e.g., from memory in the payment network 106, the issuer 108, etc.), and to transmit a request for permission to the communication device 114 (i.e., which is associated to the consumer 112, as the user profile of the consumer 112 is known to the payment network 106), along path A. The request may include transaction details, such as, for example, via a query to the consumer 112 (e.g., "Do you approve at transaction for $25.00 at Merchant 102?" etc.) (i.e., a query including transaction details), etc.

When the consumer 112 provides a permission for the transaction (and/or authentication thereof) (at the communication device 114), the communication device 114 is configured, by the payment application 118, to transmit the permission to the payment network 106. In turn, the payment network 106 is configured to compile a transaction setup message, which includes a payment account credential for a payment account issued to the consumer 112, either as received from the consumer 112 along with the permission, or as retrieved, by the payment network 106 (from memory included in the payment network 106, the issuer 108, etc.), from a user profile or other data related to the consumer 112. The transaction setup message will include, in general, data as described above (e.g., the amount of the transaction, the merchant ID, the terminal ID, the transaction ID, the acquirer ID, etc.). The payment network 106 is then configured, as above, to transmit the transaction setup message to the POS terminal 116, via the acquirer 104, as indicated by path B, or directly via the network 110.

Upon receipt of the transaction setup message, in either implementation above, the POS terminal 116 is configured to link (or match or associate) the message to the instant transaction (e.g., based on the terminal ID, transaction ID, etc.) and to generate an authorization request for the transaction (as is conventional), but based on the transaction setup message received from the payment network 106 and not a contact or conventional contactless (e.g., local, etc.) interaction with the consumer's communication device 114 or other payment device at the POS terminal 116, and to transmit the authorization request for the transaction along path C, as indicated in FIG. 1, to the acquirer 104 for processing. The authorization request, in this exemplary embodiment, is consistent with the ISO 8583 international standard for financial transaction card originated interchange messaging (and the fields and sub fields defined thereby). The data compiled into the authorization request is provided by the POS terminal 116 (as it pertains to the merchant 102, the acquirer 104, or the specifics of the transaction) and the transaction setup message (as it pertains to the consumer 112 and/or the consumer's payment account). That said, the authorization request may be a different type and/or standard of message in other embodiments.

In turn, and as is conventional, the acquirer 104 is configured to communicate the authorization request to the issuer 108 (associated with the consumer's payment account) through the payment network 106, such as, for example, through MasterCard®, VISA®, Discover®, American Express®, etc. The issuer 108 is configured to then determine whether the consumer's payment account is in good standing and/or whether there are sufficient funds and/or credit to fund the transaction (among other criteria relied upon by the issuer 108). If approved, an authorization reply, or response (indicating the approval of the transaction), is transmitted back from the issuer 108 to the merchant 102 (specifically, back to the POS terminal 116), thereby permitting the merchant 102 to complete the transaction. The transaction is later cleared and/or settled (via appropriate transaction messages such as clearing messages and/or settlement messages, for example) by and between the merchant 102, the acquirer 104, and the issuer 108 (by appropriate agreements). If the transaction is declined, however, an authorization reply (indicating the decline of the transaction) is provided back to the merchant 102 (specifically, back to the POS terminal 116), thereby permitting the merchant 102 to halt or terminate the transaction, or request alternate funding.

In at least one embodiment, in response to the transaction setup request, as provided from either the communication device 114 (in the first implementation above) or the POS terminal 116 (in the second implementation above), the payment network 106 may be configured to directly coordinate the transaction (instead of transmitting a transaction setup message to the POS terminal 116). Specifically, for example, the payment network 106 may be configured to identify the transaction setup request to the transaction (based on data included therein), to compile the authorization request for the transaction, and to transmit the authorization request to the acquirer 104 or directly to the issuer 108, etc. In so doing, in the first implementation above, the payment network 106 may be configured to compile the authorization request directly in response to the transaction setup request received from the communication device 114. In the second implementation above, the payment network 106 may be configured to initially request permission for the transaction from the consumer 112 and then, upon receiving such permission, compile the authorization request for the transaction. In either case, the authorization request is compiled based on the transaction specific data (e.g., transaction amount, etc.) and merchant specific data (e.g., terminal ID, merchant ID, merchant name, acquirer ID, etc.) included in the transaction setup request, and further based on the consumer specific data (e.g., payment account number, etc.) received/obtained in one of the following manners: included in the transaction setup message (e.g., in the first implementation above, etc.), retrieved by the payment network 106 from a user profile for the consumer 112 (e.g., in either implementation above, etc.), or received from the consumer 112 with the permission (e.g., in the second implementation above, etc.). The issuer 108, then, is configured to receive the authorization request (either directly from the payment network 106 or from the acquirer 104) and determine whether the consumer's payment account is in good standing and/or whether there are sufficient funds and/or credit to fund the transaction (among other criteria relied upon by the issuer 108). The issuer 108 then generates and transmits an authorization reply for the transaction to the merchant 102 (as is conventional) (or otherwise). It should be appreciated that in such embodiments, the submission of the transaction setup request (and subsequent permission from the consumer 112 in the second implementation) provides authorization, from the merchant 102 and the consumer 112, for the transaction.

In another embodiment, in response to transaction setup requests provided from each of the communication device 114 and the POS terminal 116, the payment network 106 may be configured to coordinate the transaction (instead of transmitting a transaction setup message to the POS terminal 116). Specifically, the payment network 106 may be configured to identify the transaction setup requests to one another (e.g., based on time, date, transaction amount, transaction ID, terminal ID, merchant ID, merchant name, customer ID, customer name, combinations thereof, etc.), to compile the authorization request for the transaction, and to transmit the authorization request to the acquirer 104 or directly to the issuer 108, etc. In so doing, the authorization request may be compiled based on the transaction specific data (e.g., transaction amount, etc.) and merchant specific data included in the transaction setup request from the POS terminal 116 (e.g., terminal ID, merchant ID, merchant name, acquirer ID, etc.) and the consumer specific data (e.g., payment account number, etc.) included in the transaction setup request from the consumer 112. The authorization reply from the issuer 108, then, is permitted to flow to the merchant 102 (as is conventional) (or otherwise) and a confirmation may be transmitted to the consumer 112, at communication device 114. It should be appreciated that in such embodiments, the submission of the transaction setup request provides authorization, from the merchant 102 and the consumer 112, for the transaction.

Transaction data is generated, collected, and stored as part of the above interactions among the merchant 102, the acquirer 104, the payment network 106, the issuer 108, and the consumer 112 (e.g., as transaction records, etc.). The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.). Additionally, or alternatively, transaction data may be transmitted among parts of the system 100 as desired and/or necessary. As used herein, transaction data may include, for example (and without limitation), primary account numbers (PANs) for consumers involved in the transactions, amounts of the transactions, transaction IDs, terminal IDs for terminals involved in the transactions (including the POS terminal 116), merchant IDs for merchants involved in the transactions, merchant category codes (MCCs), etc. It should be appreciated that more or less information related to transactions, as part of either authorization or clearing and/or settling, may be included in transaction records and stored within the system 100, at the merchant 102, the acquirer 104, the payment network 106 and/or the issuer 108.

In various exemplary embodiments, consumers (e.g., consumer 112, etc.) involved in the different transactions herein are prompted to agree to legal terms associated with their payment accounts, for example, during enrollment in their accounts, etc. In so doing, the consumers may voluntarily agree, for example, to allow merchants, issuers, payment networks, etc., to use data collected during enrollment and/or collected in connection with processing the transactions as described herein, subsequently for one or more of the different purposes described herein.

Figure 2:
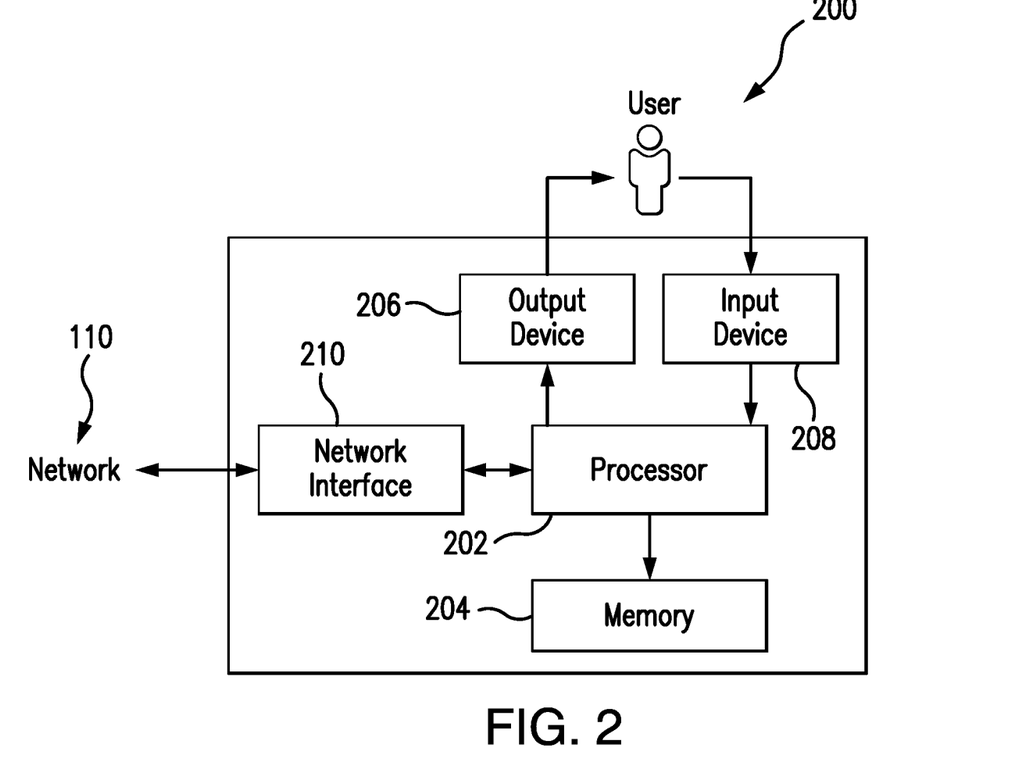
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, tablets, laptops, smartphones, point-of-sale (POS) terminals, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices.

In the exemplary embodiment of FIG. 1, each of the acquirer 104, the payment network 106, and the issuer 108 are implemented in and/or include a computing device generally consistent with the computing device 200, coupled to (and in communication with) the network 110. Also, the POS terminal 116 included in the merchant 102 and the communication device 114 associated with consumer 112 can each also be considered a computing device generally consistent with computing device 200 for purposes of the description herein. What's more, the merchant 102 may include one or more computing devices consistent with the computing device 200.

The exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. In connection therewith, the memory 204 may be configured to store, without limitation, transaction data, user identifiers, user profile, payment account credentials, transaction IDs, merchant IDs, terminal IDs, and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes an output device 206 that is coupled to (and is in communication with) the processor 202. The output device 206 outputs/presents information (e.g., solicitations for user identifiers, computer-readable symbols (e.g., QR codes, etc.), transaction details, etc.), for example, visually, audibly, etc., to a user of the computing device 200, such as, for example, the consumer 112, etc. It should be further appreciated that various interfaces (e.g., as defined by network-based applications, etc.) may be displayed at computing device 200, and in particular at output device 206, to display such information. The output device 206 may include, without limitation, a liquid crystal display (LCD), a light-emitting diode (LED) display, an LED, an organic LED (OLED) display, an "electronic ink" display, speakers, etc. In some embodiments, output device 206 includes multiple devices.

The computing device 200 also includes an input device 208 that receives inputs from the user (i.e., user inputs) such as, for example, selections for "contactless" payments, transaction details, authentication inputs, etc. The input device 208 is coupled to (and is in communication with) the processor 202 and may include, for example, a keyboard, a pointing device, a mouse, a button, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 further includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 110. Further, in some exemplary embodiments, the computing device 200 includes the processor 202 and one or more network interfaces (including the network interface 210) incorporated into or with the processor 202.

Figure 3:
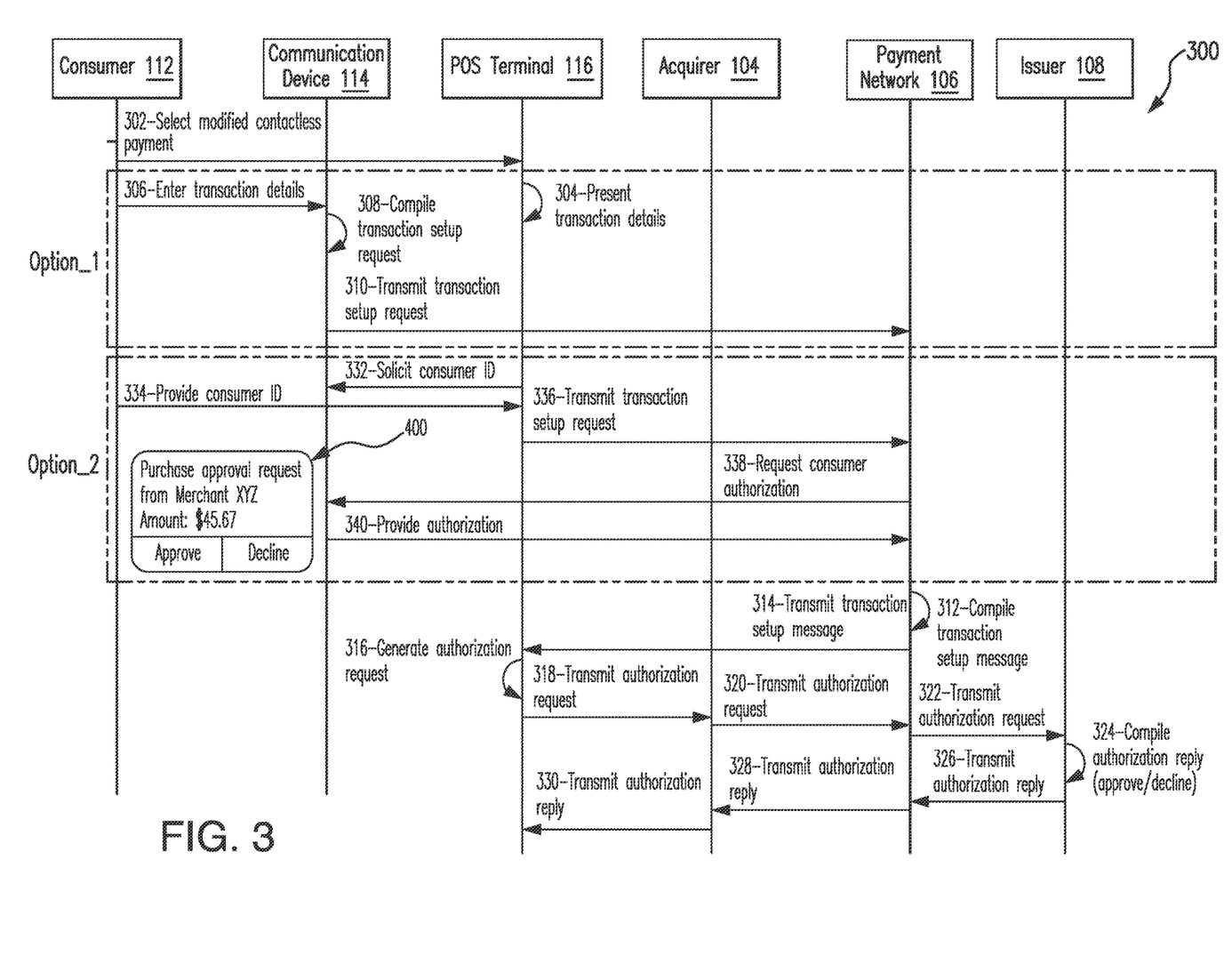
FIG. 3 is an exemplary method for use in providing contactless payment at a POS terminal, without local communication between the POS terminal and a payment device used to provide the payment, and which is suitable to be implemented in the system of FIG. 1.

FIG. 3 illustrates an exemplary method 300 for use in providing contactless payment (e.g., modified contactless payment as described herein, etc.) at a POS terminal via a payment device, without local communication (either wirelessly or through contact) directly between the POS terminal and the local payment device. The method 300 is described with reference to the system 100, and in particular to the POS terminal 116 of the merchant 102, the payment network 106, and the communication device 114 included in the system 100, and with further reference to the computing device 200. The methods described herein (including the method 300), however, should not be considered to be limited to the system 100, or the computing device 200. Likewise, the systems and devices herein should not be considered to be limited to the method 300.

Generally in the method 300, the consumer 112 interacts with the merchant 102 to identify one or more products to purchase.

When the products are selected and/or identified, for example, as scanned by the POS terminal 116 (or otherwise communicated to the POS terminal 116), the POS terminal 116 requests a form of payment, either from a cashier (broadly, the merchant 102) or the consumer 112 (e.g., by displaying the available forms of payment as selectable icons, etc.). The available forms of payment (as displayed to the consumer 112 at the POS terminal 116, for example) may include, for example, cash, check, credit card, contactless payment, and, here, modified contactless payment. In this exemplary embodiment, as shown in FIG. 3, the consumer 112 selects, at 302, modified contactless payment at the POS terminal 116. As explained above, in this example the POS terminal 116 is not capable of local, wireless communication with a payment device (e.g., a virtual wallet, etc.). As such, the POS terminal 116 has two options in response to the selection of the modified contactless payment, as indicated by the dotted boxes in FIG. 3.

In a first option, denoted Option_1 in FIG. 3, the POS terminal 116 presents, at 304, transaction details via the output device 206 of the POS terminal 116, in a manner that they are scannable and/or viewable by the consumer 112. The transaction details may include, for example, a transaction amount for the one or more products to be purchased, a merchant ID for the merchant 102, a merchant name of the merchant 102, a terminal ID for the POS terminal 116, a transaction ID for the underlying transaction (e.g., generated by the POS terminal 116 for the transaction, etc.), etc. The transaction details may be presented in text form (e.g., "Transaction ID: 12345", "Terminal ID: 12345", "Amount: $24.36", etc.), or in symbol form as machine-readable indicia (i.e., computer-readable indicia) (e.g., a QR code, a barcode, etc.), or in other suitable form (e.g., such that that the symbol is representative of the transaction details, etc.). It should be appreciated that the transaction details may include any data specific to the transaction, the merchant 102, etc., useable by the payment network 106 to identify the merchant 102 and/or the POS terminal 116. It should further be appreciated that after presenting the transaction details, the POS terminal 116 then waits in the method 300 until receipt of a transaction setup message from the payment network 106, as described in more detail below.

In response, the consumer 112 enters, at 306, the transaction details to the communication device 114 (including the payment application 118). This may be done by the consumer 112 manually keying the transaction details into the communication device 114 (e.g., when presented in text form at the POS terminal 116, etc.), or by the consumer 112 scanning the transaction details from the POS terminal 116 (in the form of the indicia), for example, via a camera input device 208 of the communication device 114, etc.

It should be appreciated that the consumer 112 may be required to authenticate himself/herself to the application 118 (e.g., via a biometric, passcode, character or motion password, etc.) prior to entering/scanning the transaction details (and/or, as discussed above, compiling or transmitting transaction setup requests), whereby the application 118 confirms that the consumer 112 is a consumer authorized to facilitate transactions, via the payment application 118, and using the payment account included therein, etc.

Upon receipt of the transaction details, the communication device 114 (as configured by the payment application 118) compiles, at 308, a transaction setup request for the transaction. The request includes, without limitation, the transaction ID, the terminal ID, and other details provided from the POS terminal 116 and/or usable to identify the POS terminal 116 and/or the merchant 102. In addition, the request includes a payment account credential for the payment account of the consumer 112, which is provisioned to the payment application 118 and provided thereby (or at least an identifier associated with the consumer 112, with which the payment account credential may be received and/or retrieved). The transaction setup request is then transmitted, at 310, from the communication device 114, to the payment network 106 (e.g., via an application programming interface (API) call exposed and/or made accessible by the payment network 106, etc.).

When the transaction setup request is received, at the payment network 106, the payment network 106 compiles, at 312, a transaction setup message based on the request from the consumer 112. In addition to the data included in the transaction setup request (as received from the communication device 114), the payment network 106 may also rely on data retrieved by the payment network 106 from memory (e.g., memory 204, etc.), which is associated with a user profile for the consumer 112 associated with the payment application 118, for example, or data retrieved from the issuer 108, etc. in connection with compiling the transaction setup message. Such data from the issuer 108 may include a payment account credential for the consumer's payment account (e.g., based on an identifier included in the transaction setup message, etc.). With that said, the transaction setup message may include, without limitation, the transaction ID, the terminal ID, the payment account credential for the consumer's payment account, an expiration date of the consumer's payment account and/or a payment device associated therewith, etc. In general, the transaction setup message will include at least sufficient information to identify the transaction, the consumer 112, and/or the payment account to be used to fund the transaction, and/or to simulate or replace (or replicate) a swipe of the payment device at the POS terminal 116.

In turn, the payment network 106 transmits, at 314, the transaction setup message to the POS terminal 116, via the acquirer 104 (e.g., as a message consistent with the ISO 8583 international standard, etc.) or directly via the network 110 (e.g., via the API call, etc.). In so doing, the payment network 106 may identify the POS terminal 116 based on the terminal ID included in the transaction setup request received from the communication device 114, or other data included in the transaction setup request or combinations thereof. It should be appreciated that the transaction setup message may be transmitted to the merchant 102, in some embodiments, where the merchant 102 then identifies the particular POS terminal 116 and provides the transaction setup message to the identified POS terminal 116.

Next in the method 300, upon receipt of the transaction setup message, the POS terminal 116 links the transaction setup message to the transaction (e.g., based on the transaction data (e.g., a transaction ID, terminal ID, etc.), etc.) and, at 316, generates an authorization request for the transaction, as is conventional, but relies on the payment account credential for the consumer's payment account, for example, received from the transaction setup message, rather than as received locally/directly from the payment device (via contact or conventional local contactless operation) at the POS terminal 116. The authorization request is also a message consistent with the ISO 8583 international standard for financial transaction card originated interchange messaging in this exemplary embodiment. For example, where the transaction setup message includes a payment account credential for the consumer 112, a merchant ID for the merchant 102, and an amount of the transaction, the POS terminal 116 may generate an authorization request that includes a payment account credential for the consumer 112, a merchant ID for the merchant 102, and an amount of the transaction, etc., in specific data elements of the ISO 8583 standard (as well as additional data associated with the merchant 102, the transaction, and/or the consumer 112, etc.). Once generated, the POS terminal 116 transmits, at 318, the authorization request to the acquirer 104, which, in turn, transmits the authorization request to the payment network 106, at 320. And, as is conventional, the payment network 106 identifies the issuer of the payment account involved in the authorization request (i.e., the issuer 108 in this example) and transmits, at 322, the authorization request to the issuer 108.

The issuer 108 will employ conventional analysis of the authorization request and the payment account to which the transaction is directed to determine whether to approve or decline the transaction (e.g., determine whether the payment account includes sufficient funds, etc.). When approved or declined, the issuer 108 compiles, as is conventional, an authorization reply, at 324. The authorization reply is transmitted, at 326, by the issuer 108 to the payment network 106. Here, as above, the authorization reply includes a message consistent with the ISO 8583 format. And, the payment network 106 then transmits the authorization reply back to the acquirer 104, at 328, which, in turn, transmits the authorization reply to the POS terminal 116, at 330. Thereafter, the merchant 102 may continue in the transaction, for example, when approved, or halt the transaction, for example, when declined.

In one embodiment, in response to receiving the transaction setup request from the communication device 114 (at 310), the payment network 106 may directly generate the authorization request for the transaction (instead of compiling and transmitting the transaction setup message at 312 and 314), and transmit the authorization request to the issuer 108 (at 322), whereby the method 300 then proceeds as described above (at 324 through 330). In so doing, the payment network 106 may generate the authorization request based on the transaction specific data (e.g., transaction amount, etc.) and merchant specific data (e.g., terminal ID, merchant ID, merchant name, acquirer ID, etc.) included in the transaction setup request, and further based on the consumer specific data (e.g., payment account number, etc.) either retrieved by the payment network 106 from a user profile for the consumer 112 or received from the consumer 112 in the transaction setup message.

Alternatively in the method 300, to initiate the contactless payment, the POS terminal 116 may perform differently, as is defined in Option_2 in FIG. 3. Specifically, in this alternative scenario, after the selection of contactless payment, at 302, the POS terminal 116 solicits a consumer ID specific to the consumer 112, at 332 (e.g., displays a request for the consumer ID and an open field for the consumer 112 to enter the requested consumer ID, etc.). In response, the consumer 112 provides the requested consumer ID, which may include, for example, an email address, a mobile phone number, a unique identifier (e.g., an application ID for the payment application 118, etc.), etc., at 334. The consumer ID, in general, identifies the consumer 112, and not the payment account issued to the consumer 112.

In turn, the POS terminal 116 generates and transmits a transaction setup request to the payment network 106, at 336. The transaction setup request again includes one or more details of the transaction, such as, for example, the transaction ID (i.e., generated by the POS terminal 116 for the specific transaction), the terminal ID of the POS terminal 116, the merchant ID of the merchant 102, the amount of the transaction, etc. In addition, the transaction setup request will include the consumer ID provided from the consumer 112. The transaction setup request may be transmitted to the payment network 106 directly, via the network 110 (e.g., via an API call), or through the acquirer 104 (e.g., consistent with the ISO 8583 international standard, etc.).

The payment network 106 then identifies the consumer 112, based on the consumer ID, and requests consumer authorization for the transaction, at 338. In general, the request is directed to the consumer 112, through the payment application 118, at the communication device 114. The request for the consumer's authorization may include details of the transaction, which permit the consumer 112 to identify the particular transaction to be given authorization. As such, the request is then presented to the consumer 112, at the communication device 114, by the application 118. As shown in FIG. 3, the request may include an interface 400, having details of the transaction (e.g., Merchant XYZ and a transaction amount of $45.67, etc.) and response buttons for the consumer 112 to either approve or to decline the transaction. By selecting to approve, the consumer 112 provides authorization to proceed with the transaction, based on the indication to the shown interface (or otherwise in other embodiments), which is provided to the payment network 106, form the communication device 114, at 340.

Thereafter in Option_2 in FIG. 3, the method 300 returns to step 312, where the transaction setup message is compiled (as described above), and to step 314, where the transaction setup message is transmitted to the POS terminal 116 (e.g., directly, via the network 110 (e.g., via an API call), or through the acquirer 104 (e.g., and consistent with the ISO 8583 international standard, etc.); etc.) (whereby the payment network 106 may identify the POS terminal 116 based on the terminal ID included in the transaction setup request received from the POS terminal 116). In this option, however, the payment account credential and/or other payment account information will be provided from the payment network 106 (e.g., from a user profile associated with the payment application 118, etc.), as determined based on the consumer ID received above (e.g., from memory of the payment network 106 and/or from the issuer 108, etc.). Thereafter, the POS terminal 116 proceeds in generating and transmitting the authorization request, at 316 through 322, whereby the transaction proceeds as above, at 324 through 330.

In one embodiment, in response to receiving the transaction setup request from the POS terminal 116 (at 336), the payment network 106 may directly generate the authorization request for the transaction (instead of compiling and transmitting the transaction setup message at 312 and 314), and transmit the authorization request to the issuer 108 (at 322), whereby the method 300 then proceeds as described above (at 324 through 330). In so doing, the payment network 106 initially requests permission for the transaction from the consumer 112 (at 338) and then, upon receiving such permission, generates the authorization request. The authorization request may be based on the transaction specific data (e.g., transaction amount, etc.) and merchant specific data (e.g., terminal ID, merchant ID, merchant name, acquirer ID, etc.) included in the transaction setup request, and further based on the consumer specific data (e.g., payment account number, etc.) either retrieved by the payment network 106 from a user profile for the consumer 112 or received from the consumer 112 with the permission (at 340).

In at least another embodiment, Option_1 and Option_2 of the method 300 may be at least partly combined, whereby transaction setup requests are transmitted to the payment network 106 for a given transaction by both the communication device 114 and the POS terminal 116 (e.g., at 310 and 336). In response, the payment network 106 may then directly generate the authorization request for the transaction (instead of compiling and transmitting the transaction setup message at 312 and 314) based on the two transaction setup requests, and transmit the authorization request to the issuer 108 (at 322). The method 300 may then proceed as described above (at 324 through 330). Specifically in this embodiment, the payment network 106 may identify and/or match the two transaction setup requests to one another (e.g., based on time, date, transaction amount, transaction ID, terminal ID, merchant ID, merchant name, customer ID, customer name, combinations thereof, etc.), and then generate the authorization request based on the transaction specific data (e.g., transaction amount, etc.) and merchant specific data included in the transaction setup request from the POS terminal 116 (e.g., terminal ID, merchant ID, merchant name, acquirer ID, etc.) and the consumer specific data (e.g., payment account number, etc.) included in the transaction setup request from the consumer 112 (or retrieved by the payment network 106 from a user profile for the consumer 112).

In view of the above, the systems and methods herein provide expansion of a capability of each of a POS terminal, a payment device, and a payment network to participate in modified contactless transactions, without local communication (conventionally associated with contactless payments) and/or contact between the POS terminal and the payment device. Specifically, the communication for the modified contactless transactions is routed through a third party, such as the payment network, with the necessary information then passed to the POS terminal, albeit not directly from the payment device. In this manner, lack of contactless transaction capabilities of the POS terminal (and lack of direct communication between the payment device and the POS terminal) is overcome to provide an extended functionality of modified contactless payment, more efficient interaction with the POS terminal, and even interactions (e.g., to precipitate transactions, etc.) that were not possible prior. What's more, the systems and methods herein operate to adapt any POS terminal for use in such modified contactless transactions.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by one or more of: (a) receiving, at a point of sale (POS) terminal associated with a merchant, a selection of a modified contactless payment option for a transaction between a consumer and the merchant; (b) presenting, by the POS terminal, at least one transaction detail associated with the transaction and specific to the POS terminal and/or the transaction; (c) receiving, by the POS terminal, a transaction setup message specific to the transaction from a payment network, the transaction setup message including a payment account credential for a payment account associated with the consumer and linked to the transaction by the at least one transaction detail; (d) generating an authorization request for the transaction, the authorization request including the payment account credential, a merchant ID associated with the merchant, and an amount of the transaction; and (e) transmitting, by the POS terminal, the authorization request for the transaction to the payment network, via an acquirer associated with the merchant, thereby initiating the transaction without interacting locally with a payment device associated with the payment account.

As will be appreciated based on the foregoing specification, the above-described embodiments of the disclosure may be implemented using computer programming or engineering techniques including computer software, firmware, hardware or any combination or subset thereof, wherein the technical effect may be achieved by one or more of: (a) receiving, at a point of sale (POS) terminal associated with a merchant, a selection of a modified contactless payment option for a transaction; (b) soliciting, by an output device of the POS terminal, from a consumer involved in the transaction at the POS terminal, a consumer ID specific to the consumer; (c) transmitting, by the POS terminal, a transaction setup request for the transaction to a payment network, the transaction setup request including the consumer ID and multiple transaction details associated with the transaction, thereby permitting the payment network to verify, with the consumer, permission for the transaction; (d) receiving, by the POS terminal, a transaction setup message for the transaction from the payment network, via an acquirer associated with the merchant, the transaction setup message including a payment account credential for a payment account associated with the consumer and at least one of the multiple transaction details; (e) generating, by the POS terminal, an authorization request for the transaction, the authorization request including at least the payment account credential, a merchant ID associated with the merchant, and an amount of the transaction; and (f) transmitting, by the POS terminal, the authorization request for the transaction to the payment network, via the acquirer, thereby initiating the transaction without interacting locally with a payment device associated with the payment account.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," "included with," or "in communication with" another element or layer, it may be directly on, engaged, connected or coupled to, associated with, or in communication with the other element or layer, or intervening elements or layers may be present. As used herein, the term "and/or" includes any and all combinations of one or more of the associated listed items.

In addition, as used herein, a product may include a service, a good, etc.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating communication with a point of sale (POS) terminal, the method comprising:

receiving, at a point of sale (POS) terminal associated with a merchant, a selection of a modified contactless payment option for a transaction between a consumer and the merchant, the POS terminal lacking local wireless payment capabilities;

displaying, by the POS terminal, to the consumer, a computer-readable symbol representing multiple transaction details associated with the transaction, thereby permitting the consumer to capture the computer-readable symbol and communicate the multiple transaction details to a payment network, the multiple transaction details including: a transaction ID specific to the transaction, a terminal ID indicative of the POS terminal, and an amount of the transaction;

after displaying the computer-readable symbol to the consumer, receiving, by the POS terminal, a transaction setup message specific to the transaction from the payment network, the transaction setup message including multiple transaction details and a payment account credential for a payment account associated with the consumer; and in response to the transaction setup message:

generating, by the POS terminal, an authorization request for the transaction, the authorization request including at least the payment account credential received from the payment network, a merchant ID associated with the merchant, the transaction ID, and the amount of the transaction; and transmitting, by the POS terminal, the authorization request for the transaction to the payment network, via an acquirer associated with the merchant, thereby initiating the transaction without local wireless communication between the POS terminal and a payment device associated with the payment account.

2. The method of claim 1, wherein the multiple transaction details further include the merchant ID associated with the merchant.

3. The method of claim 1, wherein receiving the transaction setup message includes receiving the transaction setup message via the acquirer associated with the merchant.

4. The method of claim 1, wherein the transaction setup message includes an ISO 8583 standard message.

5. The method of claim 4, wherein the authorization request includes an ISO 8583 standard message.

6. A system for facilitating a payment account transaction at a merchant, without local communication between a payment device associated with a payment account for funding the transaction and a point of sale (POS) terminal associated with the merchant, the system comprising:

a POS terminal disposed at a merchant, the POS terminal including an input device and an output device, the POS terminal lacking local wireless payment capabilities, the POS terminal configured to:

receive, at the input device, a selection of a modified contactless payment for a transaction between a consumer and the merchant;

display a computer-readable symbol representative of multiple transaction details for the transaction at the output device to the consumer, the multiple transaction details including at least one of a transaction ID for the transaction, an amount of the transaction, and a terminal ID indicative of the POS terminal, thereby permitting the consumer to capture the computer-readable symbol and communicate the multiple transaction details to a payment network;

after the computer-readable symbol is displayed to the consumer, receive a transaction setup message for the transaction from the payment network, via an acquirer associated with the merchant, the transaction setup message including a payment account credential for a payment account associated with the consumer and the multiple transaction details; and in response to the transaction setup message:

link the transaction setup message to the transaction, based on the at least one of the transaction ID and the terminal ID;

generate an authorization request for the transaction based on the transaction setup message, the authorization request including the payment account credential from the transaction setup message, a merchant ID associated with the merchant, and the amount of the transaction; and transmit the authorization request for the transaction to the payment network, via the acquirer associated with the merchant, thereby initiating the transaction without local wireless communication between the POS terminal and a payment device associated with the payment account.

7. The system of claim 6, wherein the POS terminal is configured to link the transaction setup message to said transaction based on the transaction ID and the terminal ID.

8. The system of claim 6, wherein the computer-readable symbol includes one of a QR code and a barcode.

* * * * *